_(12)_ United States Patent
Axelrod et al.

US006821538B2

(10) Patent No.: US 6,821,538 B2
(45) Date of Patent: Nov. 23, 2004

(54) BLENDS OF STARCH AND ALIPHATIC-AROMATIC BASED POLYESTER RESINS

(75) Inventors: Glen Axelrod, Colts Neck, NJ (US); Ajay Gajria, Plainsboro, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 55 days.

(21) Appl. No.: 10/191,704

(22) Filed: Jul. 9, 2002

(65) Prior Publication Data

US 2004/0009268 A1 Jan. 15, 2004

(51) Int. Cl.[7] .......................... A23K 1/00; A01K 29/00
(52) U.S. Cl. .................. 426/132; 426/250; 426/512; 426/805
(58) Field of Search .................. 426/132, 805, 426/250, 512

(56) References Cited

U.S. PATENT DOCUMENTS

| | | | | |
|---|---|---|---|---|
| 3,871,334 A | | 3/1975 | Axelrod | 119/29.5 |
| 4,513,014 A | | 4/1985 | Edwards | 426/132 |
| 4,557,219 A | | 12/1985 | Edwards | 119/29.5 |
| 4,771,733 A | | 9/1988 | Axelrod | 119/29.5 |
| 4,985,964 A | | 1/1991 | Lawson | 452/135 |
| 5,007,879 A | | 4/1991 | Lawson | 452/198 |
| 5,149,550 A | | 9/1992 | Mohilef | 426/3 |
| 5,200,212 A | | 4/1993 | Axelrod | 426/2 |
| 5,240,720 A | | 8/1993 | Axelrod | 426/2 |
| 5,407,661 A | | 4/1995 | Simone et al. | 424/49 |
| 5,476,069 A | | 12/1995 | Axelrod | 119/709 |
| 5,635,237 A | | 6/1997 | Greenberg et al. | 426/646 |
| 5,711,254 A | | 1/1998 | O'Rourke | 119/710 |
| 5,750,196 A | | 5/1998 | Welch | 427/290 |
| 5,756,194 A | * | 5/1998 | Shogren et al. | 428/312.4 |
| 5,786,382 A | | 7/1998 | Childers-Zadah | 514/629 |
| 5,827,565 A | * | 10/1998 | Axelrod | 426/623 |
| 5,852,114 A | * | 12/1998 | Loomis et al. | 525/57 |
| 5,941,197 A | | 8/1999 | Axelrod | 119/710 |
| 6,093,427 A | | 7/2000 | Axelrod | 426/104 |
| 6,093,441 A | | 7/2000 | Axelrod | 426/632 |
| 6,110,521 A | | 8/2000 | Axelrod | 426/549 |
| 6,126,978 A | | 10/2000 | Axelrod | 426/285 |
| 6,159,516 A | * | 12/2000 | Axelrod et al. | 426/456 |
| 6,178,922 B1 | * | 1/2001 | Denesuk et al. | 119/710 |
| 6,180,161 B1 | | 1/2001 | Axelrod | 426/623 |
| 6,184,261 B1 | | 2/2001 | Biby et al. | 521/84.1 |
| 6,200,616 B1 | * | 3/2001 | Axelrod et al. | 426/285 |
| 6,231,970 B1 | * | 5/2001 | Andersen et al. | 428/332 |
| 6,235,815 B1 | * | 5/2001 | Loercks et al. | 524/47 |
| 6,235,816 B1 | * | 5/2001 | Lorcks et al. | 524/47 |
| 6,515,054 B1 | * | 2/2003 | Matsushita et al. | 524/167 |
| 6,573,340 B1 | * | 6/2003 | Khemani et al. | 525/437 |
| 6,623,854 B2 | * | 9/2003 | Bond | 428/370 |

* cited by examiner

Primary Examiner—C. Sayala
(74) Attorney, Agent, or Firm—Grossman, Tucker, Perreault, Pfleger, PLLC

(57) ABSTRACT

A blend of starch and a thermoplastic aliphatic-aromatic copolyester resin, at a specific gravity of greater than 1.0. In method form, the invention comprises supplying an aromatic-aliphatic based polyester, supplying starch and mixing the aromatic-aliphatic based polyester with the starch and introducing the mixture to a melt processing apparatus wherein the aromatic-aliphatic based polyester and starch are mixed and molded or extruded into a desired shape.

17 Claims, No Drawings

BLENDS OF STARCH AND ALIPHATIC-AROMATIC BASED POLYESTER RESINS

FIELD OF THE INVENTION

The present invention relates to blends of starch and aliphatic-aromatic based polyester resins, including a process for forming injection molded products from the blends of such materials. The blends find particularly utility as applied to the manufacture of molded chew toys for animals, although other extruded/molded products are available.

BACKGROUND OF THE INVENTION

In U.S. Pat. No. 5,827,565 it is pointed out that most dogs enjoy chewing on a flavored object although preferences vary as to the hardness. Some dogs like to chew on very hard materials such as cow bones, nylon, while others prefer softer chews such as polyurethane or rubber. Some dogs, due to their age, may not be able to chew on very hard substances. Young dogs have insufficiently developed teeth, while old dogs may have diseased gums or may have lost some of their teeth.

T.F.H. Publications Inc., the owner of this application, has previously been awarded patent protection for an edible dog chew that is wholly digestible, nutritious and which maintains a texture or hardness that is individually adjustable by the application of heat to suit a wide variety of a dog's preferences or needs. Such dog chews utilize a mixture containing primarily casein and are described in U.S. Pat. Nos. 5,200,212 and 5,240,720.

In U.S. Pat. No. 5,827,565 also owned by T.F.H. Publications, Inc.,there is disclosed a process for making a heat expandable dog chew comprised primarily of injection molding potato starch granules and an attractant. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced can be modified in texture or hardness by subsequent heating, preferably in a microwave oven.

In U.S. Pat. No. 6,126,978, which is a continuation-in-part of U.S. Pat. No. 5,827,565, and which is again owned by T.F.H. Publications, Inc., there is disclosed a dog chew having natural fruit flavor to increase the dog's appetite for such chew. Such fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintained the basic ingredient of a heat-expandable starch, such as potato starch. Fruit flavoring may be added to the granules of a mixture of potato starch, water and calcium carbonate along with natural fruit flavorings.

Attention is also directed to the following U.S. Patents and copending applications, commonly owned by T.F.H. Publications Inc.: U.S. Pat. No. 5,476,069; U.S. patent application Ser. No. 08/923,070 filed Sep. 3, 1997 entitled "Vegetable Based Dog Chew" now U.S. Pat. No. 6,093,427; Ser. No. 08/738,423 filed Oct. 25, 1997 entitled "Edible Dog Chew" now U.S. Pat. No. 5,827,565; Ser. No. 08/784,834 filed Jan. 17, 1997 entitled "Carrot-Based Dog Chew" now U.S. Pat. No. 5,941,197; Ser. No. 09/114,872 filed Jul. 14, 1998 entitled "Heat Modifiable Edible Dog Chew" now U.S. Pat. No. 6,180,161; Ser. No. 09/138,804 filed Aug. 21, 1998 entitled "Improved Edible Dog Chew" now U.S. Pat. No. 6,126,978; Ser. No. 09/116,070 filed Jul. 15, 1998 entitled "Wheat & Casein Dow Chew With Modifiable Texture" now U.S. Pat. No. 6,110,521; Ser. No. 09/116,555 filed Jul. 15, 1998 entitled "Heat Modifiable Peanut Dog Chew" now U.S. Pat. No. 6,093,441; Ser. No. 09/227,767 filed Jan. 8, 1999 entitled "Method of Molding Edible Starch" now U.S. Pat. No. 6,159,516. In addition to such patents and applications, attention is also directed to the art cited in said patents and applications, as such art relates to the field of molded starch products.

In addition, the prior art has recently grown considerably to include a variety of other disclosures directed at flavored pet products. For example, U.S. Pat. No. 5,786,382 entitled "Use of Valerian Plant and/or Root as a Scent-Attractant for Stimulating Canines and Felines". This patent discloses the use of the herb/plant Valerian in all of its forms whether whole or in part, for use in food product, in such a manner that the natural aroma emitted by the Valerian plant will act as a scent/attractant for dogs and cats.

U.S. Pat. Nos. 4,985,964 and 5,007,879 entitled "Dog Chew Processing Method" disclose methods for processing cattle hoofs for use as a dog chew product.

U.S. Pat. No. 5,149,550 entitled "Methods for Making Pet Chews" discloses that ligaments from cattle and other hoofstocks are rendered substantially free of fat and can be dried and hardened for use as a pet chew.

U.S. Pat. No. 5,407,661 entitled "Pet Chew Product Having Oral Care Properties" discloses an edible pet chew product having a flexible cellular matrix in which is contained cellulosic fibrous material such as corn cob fractions which are described as having a mechanical cleansing function when chewed by a pet.

U.S. Pat. No. 5,635,237 entitled "Method of Manufacturing Substantially Pure Rawhide Pet Products" discloses a chew of pure rawhide utilizing twin screw extrusion with multiple heating zones and interchangeable extrusion dies.

U.S. Pat. No. 5,711,254 entitled "Dog Chew Toy" discloses a chew toy for dogs formed of a length of composite rope having an inner core defined by strands of twisted threads of natural plant or synthetic fibers and a soft outer shell defined by a plurality of strands of soft cotton threads twisted about the inner core. The inner core is said to be less water absorbent than the outer shell to promote drying of the toy when wetted with dog saliva to inhibit bacteria growth.

U.S. Pat. No. 5,750,196 entitled "Process for Manufacturing Dog Chew Toys of Tire Sidewalls" discloses the use of a dye to cut toy bases from sidewalls recovered from used tires.

Other earlier examples of such products are disclosed in U.S. Pat. No. 3,871,334 to Axelrod (nylon substrate containing liquid flavor and odor components) and U.S. Pat. No. 4,771,733 to Axelrod (polyurethane toy containing aqueous-based flavor and odor components). U.S. Pat. Nos. 4,557,219 and 4,513,014 to Edwards disclose the use of flavorings in a molded polyurethane chew objects.

Finally, attention is directed to U.S. Pat. No. 6,184,261, which discloses a foam that is the extrudate mixture that includes a biodegradable polymer, starch, talc, and a blowing agent. The biodegradable polymer may be poly (tetramethylene adipate-coterephthalate).

Accordingly, it is an object herein to improve further upon Applicants' earlier disclosures regarding animal chews, to form a biodegradable animal chew from a thermoplastic polyesteramide and starch. Furthermore, it is also an object of the present invention to form a biodegradable animal chew wherein the polyesteramide component is present in distinct domains dispersed within a continuous starch phase.

SUMMARY OF THE INVENTION

A blend comprising an aromatic-aliphatic based polyester and starch. In method form, the invention comprises supplying an aromatic-aliphatic based polyester, supplying starch and mixing said aromatic-aliphatic based polyester with the starch and introducing said mixture to a melt processing apparatus wherein said aromatic-aliphatic based polyester and starch are mixed and molded or extruded into a desired shape.

DETAILED DESCRIPTION OF THE PREFERRED EMBODIMENTS

As noted, the present invention comprises a blend composition formed from an aliphatic-aromatic copolyester and starch. Aliphatic-aromatic polyesters is reference to those theromplastic resins that are comprised of, in combination, one or more of an ester linkage, an aliphatic unit, and an aromatic unit, all covalently bonded to one another in the polymer chain.

Preferably, the aromatic-aliphatic polyester herein is a poly(tetramethylene adipate-co-terephthalate) resin, obtained under the tradename Eastar Bio™ from Eastman Chemical Company, Kingsport, Tenn. Poly(tetramethylene adipate-co-terephthalate) is reportedly made by condensing 1,4-benzenedicarboxylic acid (an aromatic acid) with 1,4-butanediol and an aliphatic diacid. It can be appreciated therefore, that by adjusting the level of aliphatic to aromatic concentration, a variety of different aliphatic-aromatic type polyesters can be formed, with varying physical properties. In that regard, it is preferable that in the context of the present invention, an aliphatic-aromatic based polyester is employed that has the following general characteristics with respect to the starting materials preferably employed for manufacture:

Aliphatic Diacid Component: HOOC—$(CH_2)_x$—COOH

Glycol Component: HO—$(CH_2)_y$—OH

Aromatic Acid Component: HOOC—Ar—COOH wherein the values of x and y above are in the range of 4–20, preferably 4–10, and in a most preferred embodiment, x and y are equal to the value of 4–8. With respect to the aromatic acid component, preferably, the acid groups (—COOH) are attached in para configuration on the aromatic unit (terephthalic acid), however, other isomers are contemplated, such as isophthalic acid, which configures the acid groups in the meta configuration.

In the context of the present invention it is preferred that the level of aliphatic to aromatic content in the aliphatic-aromatic polyester is specifically controlled to provide thermoplastic behavior, with an identifiable crystalline melting point. In such fashion, preferably, the aliphatic-aromatic polyester does not contain an elastomeric soft segment, with one or more of the following characteristics: 1. a glass transition temperature that occurs below room temperature; or 2. a repeating unit such as HO—$(CH_2CH_2O)_n$—H with a value of n therein being greater than or equal to 10; or 3. a number or weight average molecular weight itself of greater than 100–1000, at 1.0 increments therein. Alternatively, if such elastomeric soft segment is present, it is preferably present at a level less than or equal to 50% (wt) with respect to the crystalline and thermoplastic aliphatic-aromatic polyester noted above.

More preferably, the crystalline melting point of the aliphatic-aromatic copolyester is lower than the softening temperature of the starch to be blended herein. With that unique criterion, by setting the melt processing temperature of the extruder or injection molding machinery, to be used to facilitate blending, above the maximum softening temperature of the starch, one provides improved melt processing performance as it also helps insures plastication and dispersion of the aliphatic-aromatic copolyester within the starch extrudate.

Elaborating on the above, it should be noted that at temperatures above 90–120° C. starch is known to become destructured. The term destructured means a starch which has been heat-treated above its glass transition temperature and melting points of its components so that the components are subjected to endothermic transitions to thereby produce a consequent disorder in the molecular structure of the starch granules. In that sense, the crystallinity of the starch is destroyed.

The starch used in the present invention is preferably a natural material extracted from various plants such as corn, potato, wheat, tapioca, and cereals. Starches are polysaccharide compounds which on hydrolysis produce sugars. Starch can include a mixture of linear components generally referred to as amylose, and branched components generally referred to as amylopectin. Amylose generally has a molecular weight of several hundred thousand, while amylopectin generally has a molecular weight in the order of several million. Starches containing 0 to 100% amylose or 0 to 100% amylopectin can be employed in the invention.

As used herein, starch should be understood to preferably include starches with a high amylopectin content sometimes called waxy starches, as well as chemically and physically modified starches, such as for example starches whose acid values have been reduced, starches in which the type and concentration of cations associated with the phosphate groups have been modified, ethoxylated starches, starch acetates, cationic starches, oxidated starches and cross-linked starches.

The preferred form of the dog chew of the present invention has as a basic ingredient, a potato starch product sold under the trademark PARAGON™ IM 1010 by AVEBE of Veendam, The Netherlands. The PARAGON™ IM 1010 product is sold in the form of thermoplastic granules which are molded into a desired shape. The weight contents of such pellets are about 70% potato starch, about 15% water (about 10% after the pellets are molded), about 5 to 10% calcium carbonate, and about 1 to 5% natural vegetable additives. Optionally, to such mixture is added a flavoring such as chicken powder, liver powder, ham, turkey, beef, and/or fish in the amount of 1 to 5% by weight. Natural vegetable additives such as spinach or carrots may also be added.

In accordance with the above preferred PARAGON™ IM 1010, those skilled in the art will appreciate that an equivalent to the PARAGON™ IM 1010 would also serve as a preferred embodiment. In that regard, the potato starch can be replaced with any other equivalent starch, such as wheat starch, and the calcium carbonate, being an inorganic salt, can be replaced with any suitable inorganic salt, such as potassium carbonate, etc.

The aliphatic-aromatic copolyester component of the present invention can be made present between about 0–99% by weight based upon the weight of starch used, and at 1% increments therein. Accordingly, the level of starch herein can be at least 1% by weight, 2% by weight, 3% by weight, up to a level of 99% by weight. Preferably, 1–50% (wt), 1–40% (wt) and 1–30% (wt) of aliphatic-aromatic copolyester is combined with starch to form the mixtures herein. Most preferably, 40–60% (wt) aliphatic-aromatic copolyester is employed, and in a most preferably embodiment the aliphatic-aromatic copolyester is present at a level of about 40%, +/−10%. The aliphatic-aromatic copolyester component is preferably dry mixed with the starch component, and that mixture is then molded into a desired shape.

As those skilled in the art will appreciate, an injection molding apparatus, which is one preferred melt processing and mixing apparatus, typically contains a hopper feed section, a barrel, and an output nozzle, including a plurality of heating zones in the barrel extending from the hopper section to the nozzle. In accordance with the present invention, it has been found preferable to maintain the temperature in the first zone adjacent to the hopper at a temperature of about 125° F. More preferably, the first zone adjacent to the hopper is set in the range of about 50–175° F. In an even more preferred embodiment, i.e. that situation wherein there is a first zone adjacent to the hopper, and a second zone adjacent to that first zone, the temperature of the first zone is set to about 125° F., and the temperature of the second zone is set to between about 50–150° F. In a most preferred embodiment, the temperatures of both the first zone and second zone are each set to about 125° F.

These zone temperatures are most conveniently achieved by use of cooling coils placed about the barrel of the injection molding apparatus. These cooling coils are preferably made from copper tubing, and are cooled with circulating water.

In a particularly preferred embodiment, the following temperature profile is used to mold the aliphatic-aromatic copolyester/starch composition of the present invention: Zone 4 (closest to hopper)=125° F.; Zone 3=125° F.; Zone 2=175–350° F.; Zone 1=275–375° F.; Nozzle=275–350° F. In addition, the bushing inside the mold is preferably set to about 325–425° F. The mold temperature is preferably set at 35–65° F.

As opposed to a more conventional practice of heating the barrel of the screw to melt the material in the zones proximate to the hopper, the temperature profile set forth above results in cooling the barrel in those zones thereby preventing overheating and burning of the aliphatic-copolyester/starch mixture. In addition, use of this preferred temperature profile does not result in a thorough melt based intermixing of the aliphatic-aromatic copolyester component with the starch component. Rather, the molded aliphatic-aromatic copolyester/starch article contains discrete aliphatic-aromatic copolyester domains dispersed within a continuous starch phase. In the context of the present invention, such discrete aliphatic-aromatic copolyester domains may be visually distinct from the continuous starch phase, or readily viewable via optical microscopy.

In the context of the present invention, and as noted, a preferred aliphatic-aromatic copolyester is Eastar Bio™ copolyester, which has a crystalline peak melting point of about 108° C., and an inherent viscosity of about 1.10. In that regard, it is worth noting that such melting point is lower than the recommended processing temperature of the Paragon™ 1010 IM, which falls within the range of 160–185° C.

Furthermore, in accordance with the present invention, it has been found that the number of heat histories applied to the subject blend uniquely effects the appearance of phase separation in the final product. For example, when the aliphatic-aromatic copolyester are starch and combined and subjected to direct injection molding, one observes discrete domain formation as between the copolyester and starch, with the starch as the continuous phase. Nonetheless, such product provides a uniquely smooth and continuous surface appearance, thereby rendering it suitable for the manufacture of injection molded products.

Alternatively, the subject blend herein may be first exposed to melt blending by the step of extrusion, followed by injection molding. In this fashion, the use of two heat histories results in a reduction in the quantity of discrete domain formation that occurs in direct injection molding. Therefore, in the context of the present invention, one can uniquely consider the use of a single heat history (e.g., direct injection molding) or a double heat history (extrusion compounding followed by direct injection molding) to regulate and control the size and amount of domain formation that appears in the final product, while maintaining excellent surface properties, in the sense that the surface is smooth with appealing visual qualities.

Furthermore, it should be noted that regardless of the heat history applied, the products of the present invention are uniquely compatible, in the sense that the mechanical properties of the blend formulation provides sufficient strength, ductility and flexibility to serve, in preferred embodiment, as an animal chew toy. In addition, the present invention is preferably of a non-foamed configuration, does not rely upon the use of an added blowing agent, or added compatibilizing agent, and in that sense, the molded products herein are substantially solid plastic products with a specific gravity of greater than 1.0.

As those skilled in the art will appreciate, the product may be molded into any of a variety of shapes, including a bone, rod, ring, disk, and the like. Accordingly, in broad aspect, although injection molding is preferred, any other type of molding process is contemplated. For example, the aliphatic-aromatic copolyester/starch composition of the present invention is suitable for compression molding as well as other thermoplastic processing techniques available in the art. In that regard, the aliphatic-aromatic copolyeseter/starch mixture herein can be prepared by extrusion techniques.

In accordance with the present invention, flavorings may optionally be added to the aliphatic-aromatic copolyester/starch composition during the molding process. Natural flavorings are preferred. As will be appreciated by those skilled in the art, such flavorings may comprise both powders and liquids. The weight content of such fruit flavorings in the animal chew of the present invention may be preferably between about 0.1 weight percent and about 5.0 weight percent, but preferably fall in the range of 0.25–1.0 weight percent.

In addition, a food coloring may be added to the aliphatic-aromatic copolyester/starch mixture prior to molding to enhance the attractiveness of the chew. A natural food coloring is preferred. The weight content of such food coloring in the present invention may preferably be between about 0.05 weight percent and about 10 weight percent. More preferably, food coloring is set between 0.1–1.0 weight percent.

A fragrance may also be added to the aliphatic-aromatic copolyester/starch mixture prior to molding. The weight content of such a fragrance in the present invention may preferably be between about 0.1 weight percent and about 5.0 weight percent. In that regard, a preferred fragrance would include teatree oil.

The following examples are presented to further illustrate to persons skilled in the art how to make and use the invention and to identify presently preferred embodiments thereof. These examples are not intended as limitations, however, upon the scope of the invention, which is defined only by the appended claims. In each of the examples below, the product was melt mixed on injection molding equipment following the preferred processing conditions noted above. The products formed had excellent mechanical properties suitable for use in an animal chew toy product.

EXAMPLE 1

Paragon™ IM 1010 25 lbs; Eastar Bio™ 10 lbs; Orange Food Coloring 1.0 lb and Liver Powder 0.25 lbs.

EXAMPLE 2

Paragon™ IM 1010 35 lbs; Eastar Bio™ 20 lbs; Carmine Color 0.25 lbs; Liver Powder 0.5 lb; water 1 quart.

From all of the foregoing, it will be seen that the invention is well adapted to obtain all of the objects set forth above, with other advantages that may be inherent to its various features. It will be understood that certain features and subcombinations are of utility and may be employed herein. This is contemplated by and is within the scope of the following claims.

What is claimed is:

1. A blend of starch and a thermoplastic aliphatic-aromatic copolyester resin, at a specific gravity of greater than 1.0, said aliphatic-aromatic copolyester having a crystalline melting point, said starch having a softening temperature, wherein said crystalline melting point is lower than said softening temperature of said starch, and wherein said blend comprises discrete domains of said aliphatic-aromatic copolyester within a continous starch phase.

2. The blend of claim 1 wherein said aliphatic-aromatic polyester resin is formed by combining:
   (i) an aliphatic diacid component: $HOOC-(CH_2)_x-COOH$
   (ii) a glycol Component: $HO-(CH_2)_y-OH$
   (iii) an aromatic acid component: $HOOC-Ar-COOH$
      wherein the values of x and y are in the range of 4–20.

3. The blend of claim 2 wherein the values of x and y are in the range of 4–8.

4. The blend of claim 2 wherein the value of x and y are 4.

5. The blend of claim 1 wherein the crystalline melting point of said aliphatic-aromatic copolyester is equal to or less than 110° C.

6. The blend of claim 5 wherein the crystalline melting point of said aliphatic-aromatic copolyester is 108° C.

7. The blend of claim 1, wherein said aliphatic-aromatic copolyester is present between about 40–60% by weight.

8. The blend of claim 1, wherein said blend further comprises a food coloring, where said food coloring is present between about 0.1 weight percent to about 5 weight percent based upon the weight of the aliphatic-aromatic copolyester/starch mixture.

9. The blend of claim 1 wherein said blend further comprises a flavoring selected from the group consisting of a liquid flavoring, a powdered flavoring, and a mixture thereof, wherein said flavoring is present between about 0.1 weight percent to about 5.0 weight percent based upon the weight of the aliphatic-aromatic copolyester/starch mixture.

10. The blend of claim 1 wherein said blend is molded into the shape of a bone, a disk, a rod or a ring.

11. The blend of claim 1 wherein said starch is selected from the group consisting of corn starch, wheat starch, potato starch, tapioca starch, and a mixture thereof.

12. The blend of claim 1 wherein said starch comprises potato starch, wherein said potato starch contains an inorganic salt at a level of up to about 10% by weight.

13. The blend of claim 12 wherein said inorganic salt is calcium carbonate.

14. A method for forming a blend of starch and a thermoplastic aliphatic-aromatic copolyester resin at a specific gravity of greater than 1.0 comprising:
   supplying an aliphatic-aromatic copolyester having a crystalline melting point;
   supplying starch having a softening temperature wherein said crystalline melting point of said copolyster is lower than said softening temperature of said starch;
   mixing said aliphatic-aromatic copolyester and starch and introducing said mixture to a melt processing apparatus wherein said apparatus comprises a hopper feed section, a barrel, an output nozzle, and a plurality of heating zones in said barrel extending from said hopper section to said nozzle and wherein at least one of said heating zones are set to temperatures above the softening temperature of said starch; and
   recovering said mixture of said aliphatic-aromatic copolyester and starch from said melt processing apparatus wherein said mixture has a specific gravity of greater than 1.0.

15. The method of claim 14 wherein said heating does not result in a thorough melt intermixing of the aliphatic-aromatic copolyester with said starch component such that upon molding of said aliphatic-aromatic copolyester/starch blend into a molded shape said molded article comprises discrete aliphatic-aromatic copolyester domains within continuous starch domains.

16. The method of claim 14 wherein said plurality of heating zones comprise four heating zones which are set within the following temperature ranges: Zone 4 (closest to hopper)=125° F.; Zone 3=125° F.; Zone 2=175–350° F.; Zone 1=275–375° F.; Nozzle=275–350° F.

17. A method for forming a molded product of starch and a thermoplastic aliphatic-aromatic copolyester resin at a specific gravity of greater than 1.0 comprising:
   supplying an aliphatic-aromatic copolyester having a crystalline melting point;
   supplying starch having a softening temperature wherein said crystalline melting point of said copolyster is lower than said softening temperature of said starch;
   introducing said copolyester and starch to an extruder wherein said copolyester and starch are mixed to form an extrudate followed by introduction of said extrudate into an injection molding apparatus wherein said apparatus comprises a hopper feed section, a barrel, an output nozzle, and a plurality of heating zones in said barrel extending from said hopper section to said nozzle and wherein at least one of said heating zones is set to temperatures above the softening temperature of said starch;
   forming a molded product by injecting said copolyester and starch into a mold, wherein said molded product has a specific gravity of greater than 1.0.

* * * * *